3,440,268
PROCESS FOR PRODUCING ORGANIC
ISOCYANATES
Walter Stamm, Tarrytown, N.Y., assignor to Stauffer
Chemical Company, New York, N.Y., a corporation of Delaware
No Drawing. Filed Sept. 15, 1965, Ser. No. 487,620
Int. Cl. C07c 119/04
U.S. Cl. 260—453                         8 Claims

ABSTRACT OF THE DISCLOSURE

A process for producing organic isocyanates which comprises reacting an N-substituted carbamoyl chloride with an N,N-disubstituted amide of the formula:

wherein R is a hydrocarbon radial of from 1 to 20 carbon atoms and $R_1$ and $R_2$ are hydrocarbon radicals of from 1 to 20 carbon atoms, inclusive, at a temperature of from about 20° C. to about 40° C. and separating the so-formed organic isocyanate from the hydrochloride of the said N,N-disubstituted amide.

---

This invention relates to organic isocyanates. More particularly, the invention is concerned with improvements in the production of organic isocyanates by the dehydrohalogenation of an N-substituted carbamoyl halide.

In the industrial production of organic isocyanates, a primary amide is condensed with one equivalent of a carbonyl halide, usually phosgene and the resulting N-substituted carbamoyl chloride then heated to eliminate hydrogen chloride therefrom with consequent formation of the isocyanate. The reactions can be visualized by reference to the chemical equations given below illustrating the preparation of phenyl isocyanate by the phosgenation of aniline.

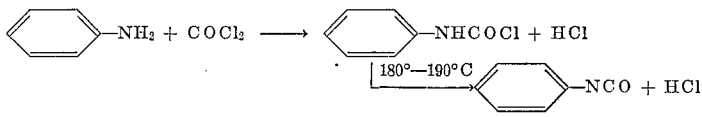

As the demand for organic isocyanates has grown, the art has expended considerable effort in developing processes and equipment for manufacturing this class of compounds. A review of the technical literature indicates that most of such endeavors were aimed at improving the efficiency and yield of the aforedescribed phosgenation reaction. But despite all the refinements introduced thus far, there still remains a particularly important area amenable to further improvement. This is the need to modify or eliminate the thermal dehydrochlorination of the N-substituted carbamoyl chloride. The evolution of hydrogen chloride at elevated temperatures constitutes a hazard to health and the gas is exceedingly corrosive and damaging to buildings and equipment. In commercial operations, such as the production of polyfunctional aromatic isocyanates for use as polyurethane foam intermediates, the problem of hydrogen chloride evolution is considerably magnified in view of the large quantities of raw materials being processed.

There is, moreover, another disadvantage attendant to the thermal dehydrochlorination of an N-substituted carbamoyl chloride to form an isocyanate. In some instances the boiling point of the isocyanate is near the temperature required to effect elimination of hydrogen chloride. As a consequence, when the N-substituted carbamoyl chloride is heated, a certain amount of the resulting isocyanate boils away along with the hydrogen chloride by-product. Nor can the problem be solved by collecting the vaporized organic isocyanates since it recombines with the hydrogen chloride to reform the N-substituted carbamoyl chloride.

It has now been discovered that hydrogen chloride can be removed from an N-substituted carbamoyl chloride to yield an isocyanate by means of certain types of weak bases and the provision of such a process constitutes the principal objects and purposes of the present invention. Other objects and purposes will become apparent subsequently.

I have found that the aforenamed objects can be realized by contacting at relatively low temperatures an N-substituted carbamoyl halide such as the chloride with an inert relatively weak organic base which abstracts hydrogen chloride from the N-substituted carbamoyl chloride thereby forming the desired isocyanate and the hydrochloride salt of the base. The isocyanate is separated from the hydrochloride salt and purified in the usual manner such as distillation, crystallization, or the like.

In producing isocyanates by the process of the invention, I prefer to phosgenate a primary amine as normally practiced and then to abstract hydrogen chloride from the resulting N-substituted carbamoyl chloride with a weak base of the type described herein and isolating the isocyanate. I have ascertained that the phosgenation of the primary amine to form the N-substituted carbamoyl chloride can likewise be conducted in the presence of the weak bases described herein which neutralize the hydrogen chloride released as a by-product of the phosgenation reaction. The N-substituted carbamoyl chloride is then treated with a further quantity of weak base, which may be identical or different from the one used in the phosgenation, to form the isocyanate. If desired, the steps of phosgenation and isocyanate formation can be performed simultaneously by employing sufficient weak base to bind the hydrogen chloride evolved from both reactions and this constitutes a further advantage and benefit of the invention.

The process as contemplated herein can be carried out with any of the primary amines of the type capable of being phosgenated in the usual manner to yield isocyanates. Generally speaking, any primary amine having at least one primary amino function attached to a hydrocarbon residue free of interfering groups is suitable. Typical primary amines includes the following:

Aromatic primary amines:

aniline
4-chloroaniline
4-ethylaniline
toluidine
4,4¹-methylenedianiline
α,α¹-Bi-p-toluidine
4,4¹-sulfonyldianiline
2,4,6-trichloroaniline
2,4,6-trimethylaniline
o-phenylenediamine
m-phenylenediamine
p-phenylenediamine
toluene-2,3-diamine
toluene-2,4-diamine
toluene-2,5-diamine
toluene-2,4,6-triamine
4-biphenylamine 5-methyl-3-biphenylamine
benzidine Aliphatic and carbocyclic amines:

ethylamine
iso-propyl amine
n-propyl amine
n-butylamine
sec-butylamine
n-amylamine
n-hexylamine
1,4-butanediamine
1,3-butanediamine
1,5-pentanediamine
1,5-hexanediamine
1,6-hexanediamine
cyclohexylamine
1,3-cyclohexanediamine
1,4-cyclohexanediamine Although the process of the invention is not dependent on any particular reaction media, I have found it convenient to employ a diluent which is nonreactive toward the process components. In this connection the relatively inert normally liquid organic solvents have proven especially useful. Such solvents include the normally liquid aromatic and saturated aliphatic hydrocarbons typified by benzene, toluene, xylene, hexane, ligroins, heptane, etc. Also useful are the liquid chlorinated derivates of the aforenamed hydrocarbons as exemplified by chlorobenzene, m-dichlorobenzene, trichlorobenzene, carbon tetrachloride, chloroform and the like. In some instances the weak base can serve as the reaction media, either alone or in admixture with the aforenamed solvents.

As previously pointed out, the basicity of the hydrogen chloride acceptor must be sufficient to abstract hydrogen chloride from the N-substituted carbamoyl chloride yet not so basic as to cause polymerization of the resulting isocyanates. As those in the art are well aware, organic isocyanates are readily trimerized to cyanurates in contact with bases. In fact, cyanurate esters are commonly prepared by trimerizing isocyanates with such relatively mild bases as pyridine and quinoline.

The salient feature of the present invention is predicated on the finding that certain weak bases, although capable of abstracting hydrogen chloride from N-substituted carbamoyl chlorides do not cause trimerization of isocyanates to cyanurates. In fact, under the conditions of my process, such weak bases are essentially inert toward isocyanates.

Weak bases which have been found to process the afore-discussed parameters are the so-called weak Lewis bases. As understood herein, a Lewis base can be defined as any substance having a free pair of electrons which it is capable of sharing with an electron acceptor, which, in the Lewis sense is called an acid. For a more detailed description of Lewis bases reference is made to any of the standard treatises on theoretical organic chemistry, such as "Electronic Interpretations of Organic Chemistry" by Edward Remick, second edition and published by John Wiley and Sons, Inc. of New York.

Lewis bases of the type suitable for practicing the invention are characterized as having a basicity in the neighborhood of the N,N-substituted amides. In this connection, I prefer the N,N-dialkyl saturated aliphatic amides of the formula $RCONR_1R_2$ wherein R is a hydrocarbon radical of from 1 to 20 carbon atoms such as alkyl, aralkyl or aryl and $R_1$ and $R_2$ are each a hydrocarbon radical of from 1 to 20 carbon atoms such as alkyl or aralkyl, although the lower alkyls are especially suitable. The lower N,N-dialkyl amides readily abstract hydrogen chloride from the N-substituted carbamoyl chloride, are inert and unreactive toward isocyanates and form insoluble hydrochloride salts which are easily separated from the isocyanate reaction product. Examples of prefered lower N,N-dialkyl aliphatic amides include N,N-dimethylacetamide, N,N-diethylacetamide, N,N-dimethylpropionamide, N,N - diethylpropionamide, N,N-diisopropylacetamide, N,N-diisobutylacetamide, N-methyl-N-n-propylacetamide, N,N-diethylbutyramide, 1-acetylpyrrolidine, 1 - acetylpiperidine, 1 - acetyl - 1,2,3,4-tetrahydroquinoline and the like.

The dehydrochlorination of the N-substituted carbamoyl chloride is preferably performed at about room temperature although lower or higher ranges are practical. It has been my finding that the reaction proceeds well between about 20° C. and 40° C. At these temperatures dehydrochlorination readily occurs in substantially quantitative yields of isocyanates. Moreover, the hydrochloride salt of the lower aliphatic N,N-dialkylamide is stable at the aforesaid temperature range and is readily filtered from the reaction mixture. After separation, the hydrochloride of the base can be heated or hydrolyzed in order to liberate the hydrogen chloride as a gas or in the form of its chloride salt if the hydrolysis is effected under basic conditions. The recovered amide is suitable for reacting with a further quantity of N-substituted carbamoyl chloride. In fact, the process of the invention is readily applicable to the continuous production of organic isocyanates by recovering and recycling the amide base.

The invention is illustrated by the following nonlimiting examples:

Example 1

A 300-ml. flask, equipped with a condenser, stirrer, thermometer, dropping funnel and a gas inlet tube, was charged with 100 ml. of benzene. Into the ice cooled benzene solution was slowly bubbled 26.7 g. (0.27 mole) of phosgene. This was followed by the slow addition of a mixture of 23 g. (0.24 mole) of aniline and 21 g. (0.24 mole) of N,N-dimethyl acetamide (DMA) with agitation and ice cooling. The solution was then allowed to warm to room temperature. With continued vigorous agitation an additional amount of 21 g. (0.24 mole) of N,N-dimethyl acetamide was added slowly and stirring continued for 3 hours at about 30–35° C. The reaction flask was cooled again, and 59 g. (97%) of crystalline DMA·HCl was removed by vacuum filtration. Benzene was stripped off at reduced pressure. The remaining colorless phenylisoyanate (27 g.; 94.5%) was purified by vacuum distillation; B.P. 63–65° C. at 20 mm.

Using the procedure of Example 1, the following primary amines were phosgenated to form the corresponding isocyanates:

| Example | Primary amine | Amide base | Isocyanate |
| --- | --- | --- | --- |
| 2 | 4-chloroaniline | 1-acetylpiperidine | 4-chlorophenyl isocyanate. |
| 3 | Aniline | do | Phenyl isocyanate. |
| 4 | p-Phenylenediamine | do | p-Phenylenediisocyanate. |
| 5 | 2,4-diaminotoluene | N,N-dimethylacetamide | Toluene-2,4-diisocyanate. |
| 6 | Butane-1,4-diamine | do | Butane-1,4-diisocyanate. |
| 7 | Hexane-1,6-diamine | N,N-dimethyl formamide | Hexane-1,6-diisocyanate. |

I claim:
1. The process of producing an aromatic, aliphatic or carbocyclic isocyanate which comprises reacting an N-aromatic, N-aliphatic or N-carbocyclic carbamoyl chloride with an N,N-disubstituted amide of the formula:

wherein R is hydrogen or a lower alkyl group and $R_1$ and $R_2$ are lower alkyl groups or taken together with the nitrogen atom form a piperidine ring, at a temperature of from about 20° C. to about 40° C. and separating the so-formed organic isocyanate from the hydrochloride of the said N,N-disubstituted amide.

2. The process of claim 1 wherein the N,N-disubstituted amide is N,N-dimethylacetamide.

3. The process of claim 1 wherein the N,N-disubstituted amide is 1-acetylpiperidine.

4. The process of claim 1 wherein the N,N-disubstituted amide is N,N-dimethylformamide.

5. The process of producing an aromatic, aliphatic, carbocyclic isocyanate which comprises:
  (a) forming an N-aromatic, N-aliphatic or N-carbocyclic carbamoyl chloride by phosgenating a primary organic amine in the presence of a lower alkyl N,N-dialkyl amide wherein said alkyl groups are lower alkyl, which binds the hydrogen chloride by-product as the N,N-dialkyl amide hydrochloride at a temperature of from about 20° C. to about 40° C.;
  (b) allowing the N-substituted carbamoyl chloride to undergo dehydrochlorination in the presence of a further quantity of the N,N-dialkyl amide at the same temperature, and
  (c) separating the so-obtained organic isocyanate from the N,N-dialkyl amide hydrochloride.

6. The process of claim 5 wherein the lower alkyl N,N-dialkyl amide is dimethylacetamide.

7. The process of claim 5 wherein the primary organic amine employed is a primary aromatic amine.

8. The process of preparing toluene diisocyanate which comprises reacting the reaction product of 2,4-diaminotoluene and phosgene with N,N-dimethylacetamide at a temperature of from about 20° C. to about 40° C. and thereafter separating the product toluene diisocyanate from the N,N-dimethylacetamide hydrochloride formed.

References Cited

UNITED STATES PATENTS 2,480,088   8/1949   Slocombe et al. __ 260—453 XR

OTHER REFERENCES

Parker: Quarterly Reviews, vol. 16, pp. 163–187, p. 183 relied upon (1962).

CHARLES B. PARKER, Primary Examiner.

DOLPH H. TORRENCE, Assistant Examiner.

U.S. Cl. X.R.

260—239, 544